2 Sheets—Sheet 1.

G. E. NOYES,

Assignor to N. S. CHASE, said CHASE assignor to N. C. & A. C. LOCKE.

Steam-Governors.

No. 9,196. Reissued May 11, 1880.

Witnesses:

W. E. Dennison.

R. D. O. Smith

Inventor:

G. E. Noyes.

G. E. NOYES, 2 Sheets—Sheet 2.

Assignor to N. S. CHASE, said CHASE assignor to N. C. & A. C. LOCKE.

Steam-Governors.

No. 9,196. Reissued May 11, 1880.

Witnesses:

N. E. Dennison.

R. D. Smith

Inventor:

G. E. Noyes.

UNITED STATES PATENT OFFICE.

GEORGE E. NOYES, OF WASHINGTON, DISTRICT OF COLUMBIA, ASSIGNOR TO NATHANIEL S. CHASE; SAID CHASE ASSIGNOR TO NATHANIEL C LOCKE AND ALPHEUS C. LOCKE, OF SALEM, MASSACHUSETTS.

STEAM-GOVERNOR.

SPECIFICATION forming part of Reissued Letters Patent No. 9,196, dated May 11, 1880.

Original No. 59,442, dated November 6, 1866. Application for reissue filed January 16, 1880.

*To all whom it may concern:*

Be it known that I, GEO. E. NOYES, of Washington city, in the county of Washington and District of Columbia, have invented a new and useful Mode of Operating Governor-Valves, (especially adapted to marine steam-engines;) and I do hereby declare that the following is a full, clear, and exact description thereof, reference being had to the accompanying drawings, forming a part of this specification.

Figure 1:
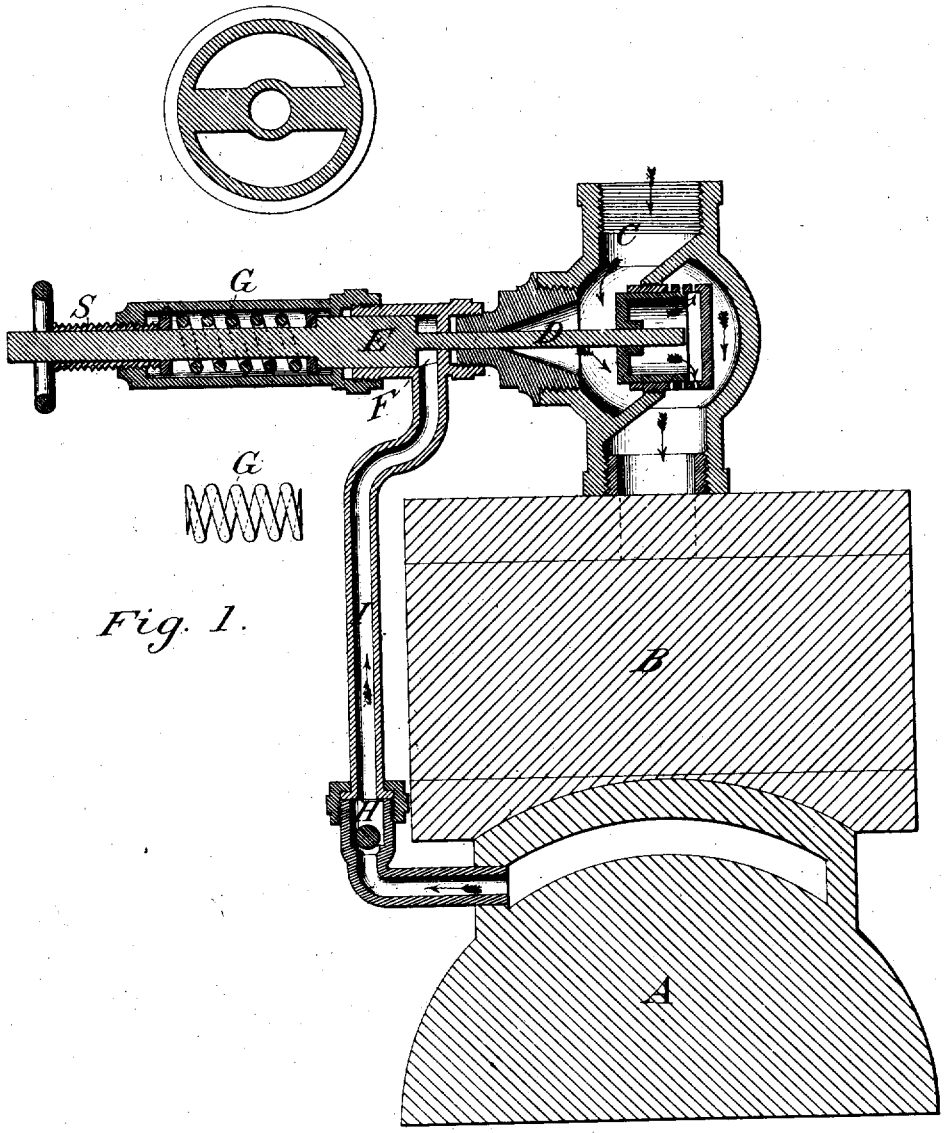
Figure 2:
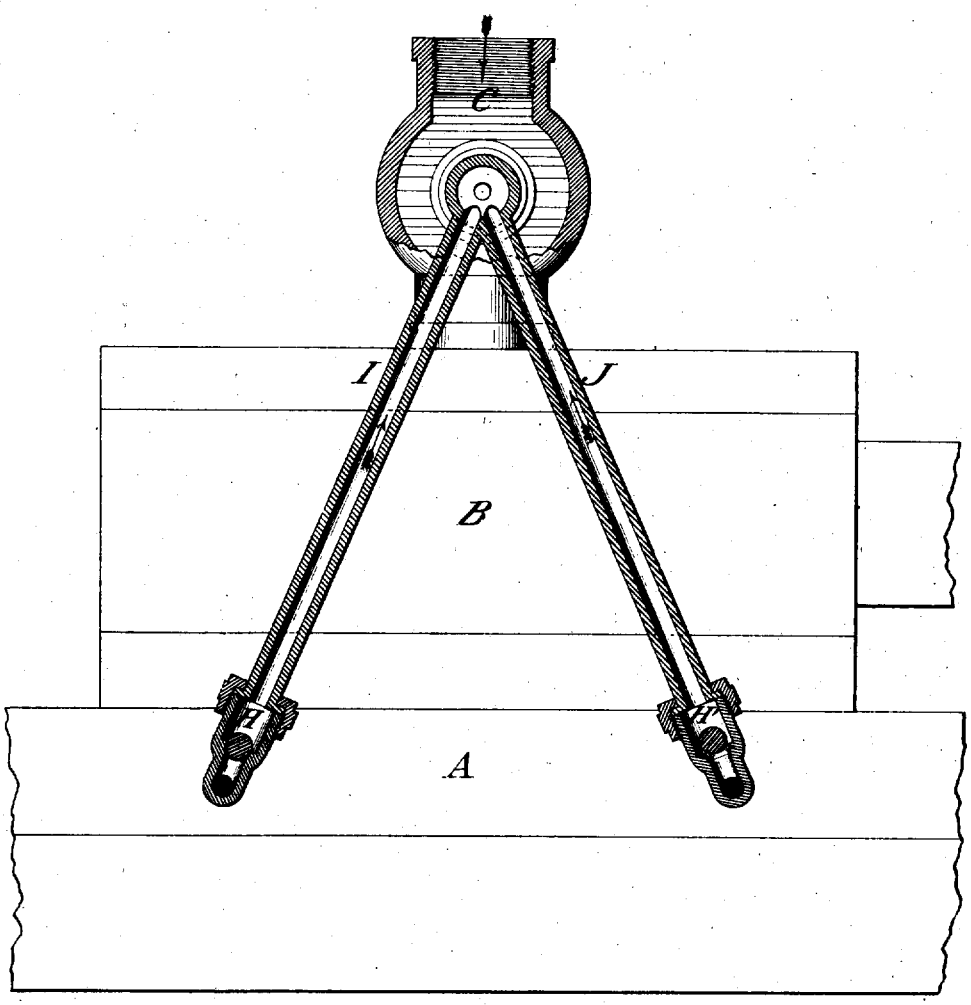

In the drawings, Figure 1 is a section longitudinal through the valve and its operating mechanism, and transverse through the cylinder and steam-chest. Fig. 2 is a section longitudinal through the steam-chest and cylinder and governor-pipes.

My invention consists in a mode of operating governor-valves by means of the motive pressure alternately admitted from opposite ends of the cylinder to a piston-head on the outer end of the governor valve-rod, so that the pressure in the cylinder shall open or close the valve more or less.

A represents a steam-cylinder; B, a steam-chest; C, a governor-valve.

The valve-rod D extends beyond the valve a foot or more, and is provided with a piston-head, E, working in a small cylinder, F.

The piston works in a suitable stuffing-box, and has a spring, G, placed behind it, the tension of which is regulated by the screw S.

I and J are two connecting pipes leading from the cylinder-head or from points in the cylinder on each side of the center to the governor-cylinder F.

The valve shown in the drawings is a slide-valve, and it is supposed that a valve of this class will generally be used with my device for governing it.

In the operation of my invention the valve C is so adjusted that when the governor is at rest the valve-ports will be partially open, so as to produce sufficient pressure in the cylinder to operate the engine without machinery. In this condition the engine will continue to operate without any material effect upon the governor, because the spring G has sufficient tension to resist the pressure on the governor-piston when there is no work for the engine; but whenever the engine is driving machinery the pressure under the main piston will be correspondingly increased in proportion to the work to be done by the decreased velocity of piston due to the performance of more work with the same volume of steam, and this increased pressure will be conveyed through pipe I or J to the governor-piston E, thereby opening the valve-ports and supplying steam in greater volume to cylinder A. The spring G at the end of each stroke returns the valve to its initial position.

The valves H H at the lower ends of the pipes I and J alternately open and close, respectively, as the steam flows into the pipes I and J.

Thus it will be seen that by this simple construction I make the pressure in the cylinder A open the valve C in the desired degree, and govern the volume and pressure of the steam in the cylinder without the waste power and expense of the ordinary governor.

It will be observed that the piston E works in a chamber, F, which is quite separate from the regulating-valve chamber, and that the valve-stem D passes through a closely-fitting neck in the valve-chamber and through a stuffing-box. By this complete separation of the valve-chamber from the piston-chamber the actuating pressure in the piston-chamber is substantially the pressure of consumption, and the induction-pressure in the valve-chamber is prevented from interfering with and altering the governing pressure in the piston-chamber F.

What I claim is—

1. A steam-governor having a valve, C, and loaded piston E, constructed and connected to be operated by the pressure of steam from the point of consumption, and not from the point of induction, substantially as described.

2. The combination, in a steam-governor having a valve, C, loaded piston E, and chamber F, of a passage inclosing the valve-stem D, with a closely-fitting neck or stuffing-box for preventing the transmission of pressure from the valve C to piston-chamber F, and a suitable passage for admitting steam-pressure to the chamber F from the steam-supply outside of the valve C, substantially as shown and described.

3. The combination, in a steam-governor, of the governor-valve C, the loaded piston E, adapted to be actuated by the direct pressure of steam at the point of consumption in a chamber, F, combined and connected with the place of consumption of the steam by the pipe I, which enters the chamber at a point between the piston E and valve C, substantially as described.

4. The combination, in a steam-governor, of the governor-valve C, the piston E, adapted to be actuated by the direct pressure of steam at the point of consumption in a chamber, F, combined and connected with the place of consumption of the steam by pipe I, which enters the chamber at a point between the piston E and valve C, substantially as described.

5. In a steam-governor, the combination of the cylinder F, the pipes I and J, adapted to connect the place of consumption of steam with said cylinder and opening into the cylinder between the piston E and valve C, whereby there is maintained in said cylinder F a steam-pressure determined by the pressure at the place of consumption, and not at the place of introduction, substantially as described.

6. A steam-governor consisting of the governor-valve C, chamber F, and loaded piston E, adapted to be operated by pressure of steam admitted to said chamber at a point between the piston E and the valve C, substantially as and for the purposes described.

7. In a steam-governor, the combination of the governor-valve C, the piston E, cylinder F, and a steam-supply pipe entering said chamber between the piston and the valve and connecting said chamber with a steam-supply outside the valve-chamber, substantially as and for the purposes set forth.

G. E. NOYES.

Witnesses:
W. E. DENNISON,
R. D. O. SMITH.